United States Patent
Martens

(10) Patent No.: US 10,180,104 B2
(45) Date of Patent: Jan. 15, 2019

(54) VARIABLE TURBINE AND/OR COMPRESSOR GEOMETRY FOR AN EXHAUST-GAS TURBOCHARGER

(71) Applicant: Bosch Mahle Turbo Systems GmbH & Co. KG, Stuttgart (DE)

(72) Inventor: Anatolij Martens, Eislingen (DE)

(73) Assignee: Bosch Mahle Turbo Systems GmBH & CO. KG (DE)

( * ) Notice: Subject to any disclaimer, the term of this patent is extended or adjusted under 35 U.S.C. 154(b) by 404 days.

(21) Appl. No.: 15/167,342

(22) Filed: May 27, 2016

(65) Prior Publication Data

US 2016/0348575 A1    Dec. 1, 2016

(30) Foreign Application Priority Data

May 28, 2015 (DE) .......................... 10 2015 209 813

(51) Int. Cl.
*F01D 17/18* (2006.01)
*F02B 37/24* (2006.01)
(Continued)

(52) U.S. Cl.
CPC .............. *F02B 37/24* (2013.01); *F01D 9/041* (2013.01); *F01D 17/14* (2013.01); *F01D 17/165* (2013.01);
(Continued)

(58) Field of Classification Search
CPC .................................................... F01D 17/165
See application file for complete search history.

(56) References Cited

U.S. PATENT DOCUMENTS 2,154,199 A * 4/1939 Colwell ................ F04D 29/126
                                                                 277/399
5,498,128 A * 3/1996 Baets .................... F01D 17/165
                                                                 415/156
(Continued)

FOREIGN PATENT DOCUMENTS

DE           10209444 A1     9/2003
DE           102620060 B4    9/2005
(Continued)

OTHER PUBLICATIONS

English abstract for DE-102007052735.
(Continued)

*Primary Examiner* — Woody Lee, Jr.
(74) *Attorney, Agent, or Firm* — Fishman Stewart PLLC

(57) ABSTRACT

A variable geometry may include a blade bearing ring, guide blades mounted therein or thereon in a rotatable manner, and an adjustment ring for simultaneously adjusting the guide blades. The adjustment ring may be in operative connection with adjusting levers of the guide blades, and may be mounted on the blade bearing ring via rollers. A roll engagement may be provided for each roller, which may be guided into and may roll onto the respective roll engagement. Each roller may have two guide collars between which a groove runs and on which the roller may roll onto the blade bearing ring. A rail may be arranged on the blade bearing ring, and may engage in the groove between the two guide collars for each roller. Each roller may be retained on the blade bearing ring and on the adjustment ring exclusively via the guide collars of the respective roller.

20 Claims, 1 Drawing Sheet

(51) Int. Cl.
  *F01D 17/16* (2006.01)
  *F01D 9/04* (2006.01)
  *F01D 17/14* (2006.01)
  *F02B 37/22* (2006.01)
  *F04D 29/44* (2006.01)
  *F04D 29/46* (2006.01)
  *F01D 25/16* (2006.01)
  *F02C 6/12* (2006.01)
  *F02C 7/06* (2006.01)

(52) U.S. Cl.
  CPC .......... *F02B 37/225* (2013.01); *F04D 29/444* (2013.01); *F04D 29/462* (2013.01); *F01D 25/16* (2013.01); *F02C 6/12* (2013.01); *F02C 7/06* (2013.01); *F05D 2220/40* (2013.01); *F05D 2230/60* (2013.01); *F05D 2240/54* (2013.01); *F05D 2250/232* (2013.01)

(56) References Cited

U.S. PATENT DOCUMENTS

| | | | |
|---|---|---|---|
| 6,007,303 A * | 12/1999 | Schmidt | H02K 49/104 123/41.47 |
| 6,962,481 B2 | 11/2005 | Knauer et al. | |
| 7,322,791 B2 | 1/2008 | Stilgenbauer | |
| 7,406,826 B2 | 8/2008 | Hayashi et al. | |
| 9,822,642 B2 * | 11/2017 | Anderson | F01C 21/06 |
| 2003/0170117 A1 | 9/2003 | Knauer et al. | |
| 2005/0252210 A1 * | 11/2005 | Shiraishi | F01D 17/165 60/602 |
| 2009/0252601 A1 * | 10/2009 | Wengert | F01D 17/165 415/163 |
| 2012/0315164 A1 * | 12/2012 | Mayernick | F01D 17/165 417/406 |
| 2014/0041181 A1 * | 2/2014 | Ubukata | B23Q 3/063 29/402.01 |
| 2015/0118029 A1 * | 4/2015 | Radke | F02B 37/24 415/159 |
| 2017/0016343 A1 * | 1/2017 | Lummer | F01D 17/165 |
| 2017/0159555 A1 * | 6/2017 | Reyes | F01D 17/165 |

FOREIGN PATENT DOCUMENTS

| | | |
|---|---|---|
| DE | 102007052735 A1 | 5/2009 |
| DE | 102009008532 A1 | 8/2010 |
| DE | 102010042181 A1 | 4/2012 |
| EP | 1394363 A1 | 3/2004 |
| WO | WO-2009065763 A2 | 5/2009 |

OTHER PUBLICATIONS

English abstract for DE-102009008532.
English abstract for DE-102010042181.
German Search Report for DE-102015209813.3.
European Search Report dated Nov. 17, 2016 for EP Application No. 16167316.5.
English Abstract for DE-10209444-A1.

* cited by examiner

VARIABLE TURBINE AND/OR COMPRESSOR GEOMETRY FOR AN EXHAUST-GAS TURBOCHARGER

CROSS REFERENCE TO RELATED APPLICATIONS

This application claims priority to German Patent Application No. 10 2015 209 813.3, filed May 28, 2015, the contents of which are hereby incorporated by reference in their entirety.

TECHNICAL FIELD

The present invention relates to a variable turbine and/or compressor geometry for an exhaust-gas turbocharger. The invention also relates to an exhaust-gas turbocharger with such a variable turbine and/or compressor geometry as well as to a method for assembling such a turbine and/or compressor geometry.

BACKGROUND

In principle, there are two alternative possibilities of mounting an adjustment ring on the blade bearing ring for variable turbine and/or compressor geometries. The first possibility is a slide bearing, which may be simple to produce in terms of production engineering, but requires comparatively large actuation forces. The other possibility to this end is the so-called roller bearing, in which the adjustment ring is mounted on the blade bearing ring via a plurality of rollers. The latter method may allow comparatively low positioning forces to be realized, but the technical realization of such a roller-mounted variable turbine and/or compressor geometry is in turn comparatively elaborate and thus expensive as well.

A variable turbine and/or compressor geometry for an exhaust-gas turbocharger of the type in question with a generic blade bearing ring, on which individual guide blades are mounted in a rotatable manner, is known from DE 102 62 006 B4. Additionally provided is an adjustment ring for simultaneously adjusting the individual guide blades, wherein the positioning ring is in operative connection with adjusting levers of the guide blades. Mounting of the adjustment ring thereby ensues on the blade bearing ring via rollers. Said rollers per se have axial extensions produced integrally therewith, which are inserted in appropriate bores in the nozzle ring and/or in a housing section, where they are mounted in a freely rotatable manner. Here, the axial extensions have a diameter that is smaller than the diameter of the actual rollers. Such a variable turbine and/or compressor geometry is comparatively elaborate to produce, as corresponding bores are inserted in the nozzle ring and/or in the housing and the individual rollers also need to be individually mounted. A further great disadvantage is the fact that the variable turbine and/or compressor geometry cannot be produced as a pre-assembled unit with blade bearing ring, rollers, guide blades and adjustment ring and installed in the turbine housing as a unit.

A variable turbine and/or compressor geometry for an exhaust-gas turbocharger in which the adjustment ring is, however, mounted via a slide bearing relative to the blade bearing ring, is also known from U.S. Pat. No. 7,406,826 B2.

SUMMARY

It is therefore the object of the present invention to provide an improved or at least an alternative embodiment for a variable turbine and/or compressor geometry of the type in question, which in particular allows a simple, cost-effective and, above all, separate prefabrication.

According to the invention, said object is achieved by the subject matter of the independent claims. Advantageous embodiments are the subject matter of the dependent claims.

The present invention is based on the general concept of no longer mounting individual rollers of a roller bearing of an adjustment ring in a rotatable manner on a blade bearing ring of a variable turbine and/or compressor geometry via a corresponding axial extension in the blade bearing ring, but instead of equipping each roller with two guide collars (wheel flanges) and of providing a complementary rail designed to this end on the blade bearing ring, whereby the rollers ensure the cohesion of the variable turbine and/or compressor geometry exclusively via the roller flanges, without needing to be separately mounted in a rotatable manner in the blade bearing ring to this end. The variable turbine and/or compressor geometry for an exhaust-gas turbocharger according to the invention thus has a blade bearing ring, as known per se, on/in which the guide blades are mounted in a rotatable manner. Also provided is an adjustment ring for simultaneously adjusting the guide blades, wherein the adjustment ring is in operative connection with adjusting levers of the individual guide blades. According to the invention, a roll engagement, into which the respective roller is inserted and onto which it rolls when the adjustment ring is adjusted, is now provided on the adjustment ring for each roller. Furthermore, each roller has two guide collars that each function as a type of flange and between which a groove runs, wherein each roller rolls onto the blade bearing ring via the guide collars of said roller. By means of the comparatively small contact surfaces between the guide collars with an associated rail on the blade bearing ring is allowed a particularly smooth adjustment to be achieved. To this end, a rail is arranged on the blade bearing ring, said rail engaging in the groove between the two guide collars. Each roller is thereby retained on both the blade bearing ring and the adjustment ring exclusively via the guide collars of said roller, while simultaneously fixing the adjustment ring on the blade bearing ring. Separate fastening of the individual rollers in the blade bearing ring is no longer required, which allows the variable turbine and/or compressor geometry according to the invention to be produced comparatively simply and cost-effectively and also offers the great advantage that the variable turbine and/or compressor geometry can be prefabricated with blade bearing ring, guide blades, adjustment ring and rollers as a separate component and can, for example, be integrated in an exhaust-gas turbocharger.

In one advantageous further development of the solution according to the invention an axial extension is arranged on at least one roller as axial stop on the blade bearing ring. The axial extension can, for example, have a specific coating, which significantly improves the sliding characteristics, thus allowing the axial extension of each roller to slide comparatively easily over a surface of the blade bearing ring.

In one advantageous further development of the solution according to the invention the rail on the blade bearing ring has at least one recess, which allows for an insertion of the roller. The variable turbine and/or compressor geometry is thereby assembled in the manner of a bayonet closure, in which the individual rollers are initially inserted in the respectively associated roll engagements on the adjustment ring and the adjustment ring is then positioned in such a way in relation to the blade bearing ring that the roll engagements and the recesses on the blade bearing ring allow the rollers to be introduced into the rail of the blade bearing ring. The adjustment ring is then rotated in the manner of a bayonet closure, wherein the rollers are now fixed to the adjustment ring on the blade bearing ring on the basis of the guide collars of said rollers. The individual guide blades with the blade bearing trunnions thereof are now passed through the blade bearing ring, and the adjusting lever then attached to the ends of the blade bearing trunnion facing away from the respective guide blade in such a way that they are in operative connection with the adjustment ring. This can, for example, be achieved in such a way that each adjusting lever has a fork-shaped recess, in which an associated trunnion of the adjustment ring needs to engage, in order to allow simultaneous adjustment of the guide blades when rotating the adjustment ring.

The present invention is also based on the general inventive concept of equipping turbochargers with such a variable turbine and/or compressor geometry, wherein said variable turbine and/or compressor geometry according to the invention can, for example, be prefabricated as a separate component and not mounted in a compressor housing and/or turbine housing of the exhaust-gas turbocharger until a later assembly step.

Further important features and advantages of the invention result from the sub-claims, from the drawings and from the associated illustrative description on the basis of the drawings.

It is understood that the previously stated features and those still to be explained in the following are not only usable in each of the stated combinations, but also in other combinations or alone, without leaving the scope of the present invention.

BRIEF DESCRIPTION OF THE DRAWINGS

Preferred exemplary embodiments of the invention are shown in the drawings and are explained in more detail in the following description, wherein identical reference numerals refer to identical, similar or functionally identical components.

The figures in each case schematically show in.

DETAILED DESCRIPTION

Figure 1:
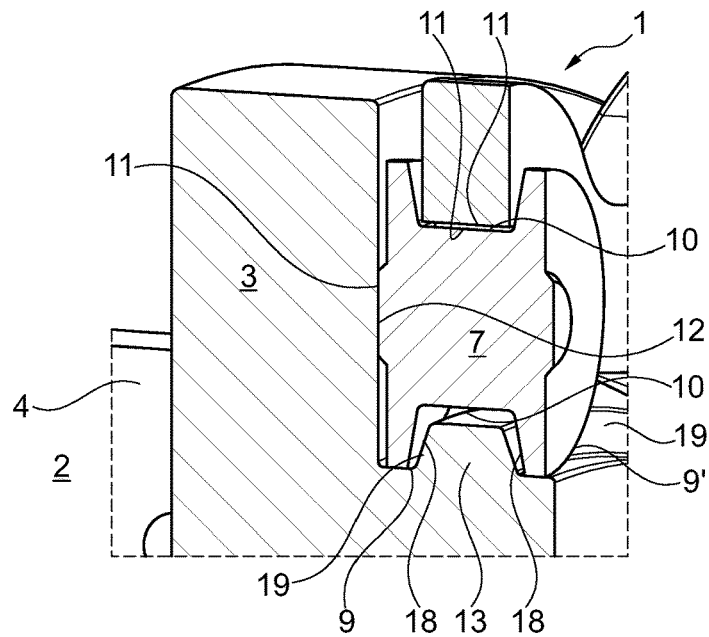
FIG. 1 a sectional illustration through a variable turbine and/or compressor geometry according to the invention in the region of a roller, FIG. 2 a diagram as in FIG. 1, but with additional adjusting levers and guide blades, FIG. 3 a partial view of the variable turbine and/or compressor geometry, but without guide blades, FIG. 4 an illustration as in FIG. 2, but without rollers, FIG. 5 an illustration as in FIG. 3, but also without rollers.
Figure 2:
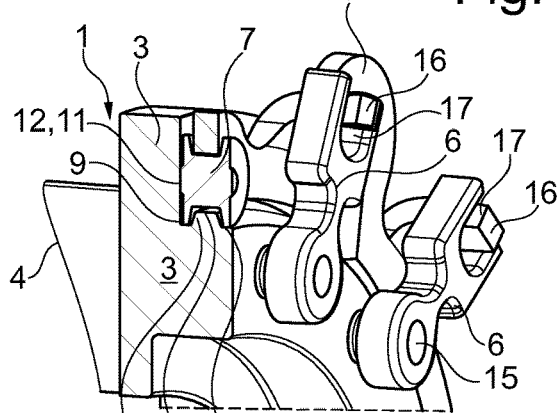
Figure 3:
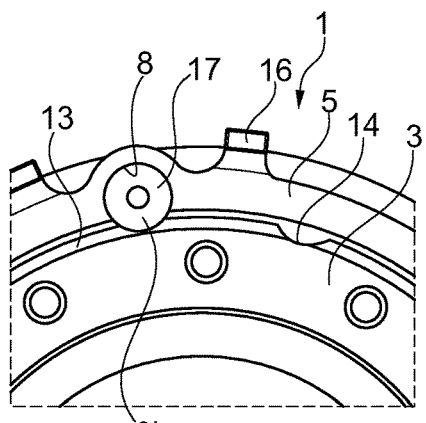
Figure 4:
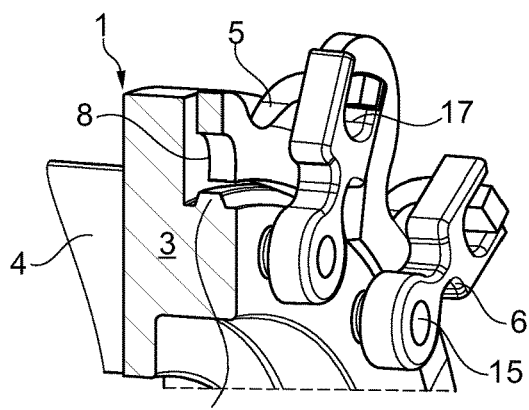
Figure 5:
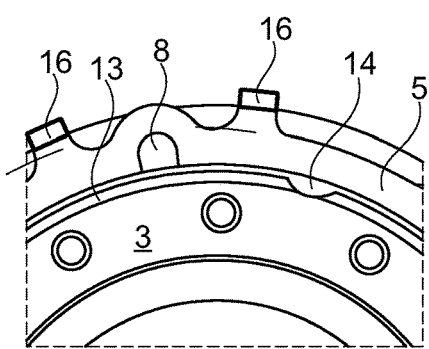

According to FIGS. 1, 2 and 4, a variable turbine and/or compressor geometry 1 according to the invention for an exhaust-gas turbocharger 2 has a blade bearing ring 3, on/in which guide blades 4 are mounted in a rotatable manner. Also provided is an adjustment ring 5 for simultaneously adjusting the guide blades 4, wherein said adjustment ring 5 is in operative connection with adjusting levers 6 of the guide blades 4. Here, mounting of the adjustment ring 5 is on the blade bearing ring 3 ensues via rollers 7. According to the invention, a separate roll engagement 8 (cf. in particular FIGS. 4 and 5 as well) is now provided on the adjustment ring 5 for each roller 7, into which the respective roller 7 is not just guided, but also rolls onto, i.e. is carried along relative to the blade bearing ring 3 when the adjustment ring 5 is rotated. If one observes the rollers 7 more closely, it is evident that each of the latter has two guide collars 9, 9', between which a groove 10 runs and on which the roller 7 rolls onto the blade bearing ring 3. It is thereby possible to realise a comparatively small rolling resistance, as the respective rollers 7 roll onto the blade bearing ring 3 exclusively via the comparatively small outer shell surfaces of the guide collars 9, 9'. In addition, a rail 13 is arranged on the blade bearing ring 3, said rail 13 engaging in the groove 10 between the two guide collars 9, 9' of the roller 7. The adjustment ring 5 slides over the roll engagement 8 thereof along the groove 10 and, for example, is therefore advantageous here, provided that a slide-resistance-reducing coating 11 is arranged on one of the contact surfaces on the roller 7 and/or on the roll engagement 8.

If one particularly considers FIGS. 1 and 2, it can be discerned that each roller 7 is retained on the blade bearing ring 3 and on the adjustment ring 5 exclusively via the two guide collars 9, 9' of said roller 7, which also offers the great advantage that the variable turbine and/or compressor geometry 1 can be produced as a separate and in particular also prefabricated component. In addition, an axial extension 12 (FIG. 1) is arranged on at least one roller 7 as axial stop on the blade bearing ring 3, wherein a slide-resistance-reducing coating 11 for smooth mounting might also be attached here. Said coating 11 might be attached to the axial extension 12 and/or to an associated surface on the blade bearing ring 12.

If one reconsiders FIG. 1, it is evident that the two guide collars 9, 9' have conical inner flanks 18, which are each located opposite to the conical outer flanks 19 of the rail 13 on the blade bearing ring 3. The conical inner flanks 18 on the guide collar 9, 9' are however configured steeper than the conical outer flanks 19 on the rail 13. This, for example, provides the advantage that the respective roller 7 makes contact exclusively over a minimal region between the inner flank 18 and the associated outer flank 19 of the rail 13. At the same time, the conical inner flank 18 of the roller 7 allows a guiding of the adjustment ring 5.

In order to enable the variable turbine and/or compressor geometry 1 according to the invention to be assembled as simply as possible, the rail 13 comprises at least one recess 14 on the blade bearing ring 3, via which is allowed to introduce the roller 7. The variable turbine and/or compressor geometry according to the invention is thereby mounted as follows: the rollers 7 are initially inserted in the associated roll engagements 8 of the adjustment ring 5, wherein the adjustment 5 is then positioned in such a way in relation to the blade bearing ring 3 that the roll engagements 8 and the recesses 14 on the blade bearing ring 3 allow the rollers 7 to be introduced into the rail 13 of the blade bearing ring 3. If the adjustment ring 5 is axially adjusted to the extent that the individual rollers 7 with the guide collars 9, 9' thereof encompass the rail 13, the adjustment ring 5 is rotated relative to the blade bearing ring 3, which produces a type of bayonet closure between the adjustment ring 5 and the blade bearing ring 3. The guide blades 4 with the blade bearing trunnions 15 thereof are then passed through the associated openings in the blade bearing ring 3 and the adjusting levers 6 are then plugged onto the blade bearing trunnions 15 in such a way that they are in operative connection with the adjustment ring 5. This can, for example, ensue in that the adjustment ring 5, including trunnions 16 appropriately arranged thereon, engages into associated recesses 17 of the respective adjusting lever 6. The variable turbine and/or compressor geometry is now completed and can be supplied as prefabricated, separate assembly to a further assembly process for producing the exhaust-gas turbocharger 2.

The variable turbine and/or compressor geometry 1 according to the invention allows the latter to be separately prefabricated and also allows a roller mounting of an adjustment ring 5 on a blade bearing ring 3 to be achieved without great constructive effort and thus with low production costs.

The invention claimed is:

1. A variable geometry for an exhaust-gas turbocharger, comprising:
   a blade bearing ring,
   guide blades mounted one of in or on the blade bearing ring in a rotatable manner, and
   an adjustment ring for simultaneously adjusting the guide blades, the adjustment ring being in operative connection with adjusting levers of the guide blades,
   the adjustment ring being mounted on the blade bearing ring via rollers,
   wherein a roll engagement is provided for each roller on the adjustment ring, each roller being guided into and rolling onto the respective roll engagement,
   wherein each roller has two guide collars between which a groove runs and on which the roller rolls onto the blade bearing ring,
   wherein a rail is arranged on the blade bearing ring, the rail engaging in the groove between the two guide collars, and
   wherein each roller is retained on the blade bearing ring and on the adjustment ring exclusively via the guide collars of the respective roller.

2. A variable geometry according to claim 1, further comprising an axial extension arranged on at least one roller as an axial stop on the blade bearing ring.

3. A variable geometry according to claim 2, wherein the rail includes at least one recess on the blade bearing ring through which the roller is able to be introduced.

4. A variable geometry according to claim 2, wherein the two guide collars include conical inner flanks.

5. A variable geometry according to claim 4, wherein the rail includes conical outer flanks on the blade bearing ring.

6. A variable geometry according to claim 5, wherein the conical inner flanks on the guide collars are steeper than the conical outer flanks on the rail.

7. A variable geometry according to claim 1, wherein the rail includes at least one recess on the blade bearing ring through which the roller is able to be introduced.

8. A variable geometry according to claim 1, wherein the two guide collars include conical inner flanks.

9. A variable geometry according to claim 8, wherein the rail includes conical outer flanks on the blade bearing ring.

10. A variable geometry according to claim 9, wherein the conical inner flanks on the guide collars are steeper than the conical outer flanks on the rail.

11. An exhaust-gas turbocharger comprising a variable geometry having:
    a blade bearing ring,
    guide blades mounted one of in or on the blade bearing ring in a rotatable manner, and
    an adjustment ring for simultaneously adjusting the guide blades, the adjustment ring being in operative connection with adjusting levers of the guide blades, the adjustment ring being mounted on the blade bearing ring via rollers,
    wherein a roll engagement is provided for each roller on the adjustment ring, each roller being guided into and rolling onto the respective roll engagement,
    wherein each roller has two guide collars between which a groove runs and on which the roller rolls onto the blade bearing ring,
    wherein a rail is arranged on the blade bearing ring, the rail engaging in the groove between the two guide collars for each roller, and
    wherein each roller is retained on the blade bearing ring and on the adjustment ring exclusively via the guide collars of the respective roller.

12. An exhaust-gas turbocharger according to claim 11, further comprising an axial extension arranged on at least one roller as an axial stop on the blade bearing ring.

13. An exhaust-gas turbocharger according to claim 12, wherein the rail includes at least one recess on the blade bearing ring through which the roller is able to be introduced.

14. An exhaust-gas turbocharger according to claim 11, wherein the rail includes at least one recess on the blade bearing ring through which the roller is able to be introduced.

15. An exhaust-gas turbocharger according to claim 11, wherein the two guide collars include conical inner flanks.

16. An exhaust-gas turbocharger according to claim 15, wherein the rail includes conical outer flanks on the blade bearing ring.

17. An exhaust-gas turbocharger according to claim 16, wherein the conical inner flanks on the guide collars are steeper than the conical outer flanks on the rail.

18. An exhaust-gas turbocharger according to claim 11, wherein the rail includes conical outer flanks on the blade bearing ring.

19. A variable geometry according to claim 1, wherein the rail includes conical outer flanks on the blade bearing ring.

20. A method for assembling a variable geometry, comprising:
    inserting rollers in associated roller engagements of an adjustment ring of the variable geometry,
    positioning the adjustment ring in relation to a blade bearing ring of the variable geometry such that the roller engagements and recesses on the blade bearing ring allow the rollers to be introduced into a rail of the blade bearing ring,
    rotating the adjustment ring,
    inserting guide blades, including blade bearing trunnions, in the blade bearing ring, and
    attaching an adjusting lever to the blade bearing trunnions in such a way that it is in operative contact with the adjustment ring.

* * * * *